United States Patent
Cupo et al.

(10) Patent No.: US 6,853,686 B1
(45) Date of Patent: Feb. 8, 2005

(54) FRAME FORMATTING TECHNIQUE

(75) Inventors: Robert Louis Cupo, Eatontown, NJ (US); Yong J. Lee, Holmdel, NJ (US); Mojtaba Shariat, Matawan, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/483,725

(22) Filed: Jan. 14, 2000

(51) Int. Cl.⁷ .............................................. H04L 27/00
(52) U.S. Cl. ..................... 375/259; 375/295; 375/316; 370/470; 455/3.02
(58) Field of Search ................................ 375/253, 259, 375/260, 240, 219, 295; 455/3.02; 370/470, 473, 395.1, 476

(56) References Cited

U.S. PATENT DOCUMENTS

| | | | | |
|---|---|---|---|---|
| 3,754,102 A | * | 8/1973 | Clark .......................... | 370/510 |
| 5,319,707 A | * | 6/1994 | Wasilewski et al. ........ | 380/212 |
| 5,481,554 A | * | 1/1996 | Kondo ....................... | 714/807 |
| 5,511,073 A | * | 4/1996 | Padovani et al. ........... | 370/471 |
| 5,579,303 A | * | 11/1996 | Kiriyama ..................... | 370/252 |
| 5,587,810 A | * | 12/1996 | Feldman ..................... | 358/442 |
| 5,953,378 A | * | 9/1999 | Hotani et al. ............... | 375/341 |
| 6,233,251 B1 | * | 5/2001 | Kurobe et al. .............. | 370/471 |
| 6,330,233 B1 | * | 12/2001 | Miya et al. ................. | 370/342 |

OTHER PUBLICATIONS

Derwent–ACC–No. 1996–404860 (Abstract page).*

* cited by examiner

*Primary Examiner*—Jean B. Corrielus
(74) *Attorney, Agent, or Firm*—Synnestvedt & Lechner LLP

(57) ABSTRACT

A frame formatting technique for filling a fixed length master frame with a number of variable length frames and adding additional data to synchronize the individual variable length frames and increase the randomness of the fixed length master frame. The technique fills unused portions of the fixed length master frame with random data to maximize the randomness of the fixed length master frame which can be used to produce a well behaved modulated signal for digital broadcasting, thereby increasing the efficiency of digital broadcasting system.

7 Claims, 5 Drawing Sheets

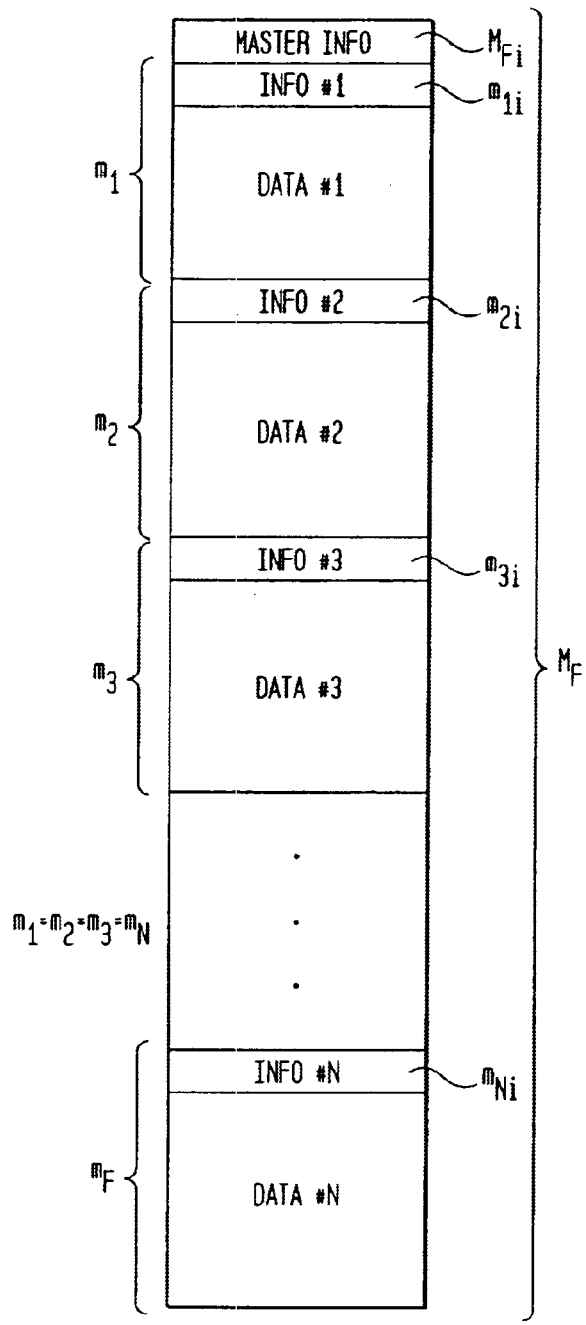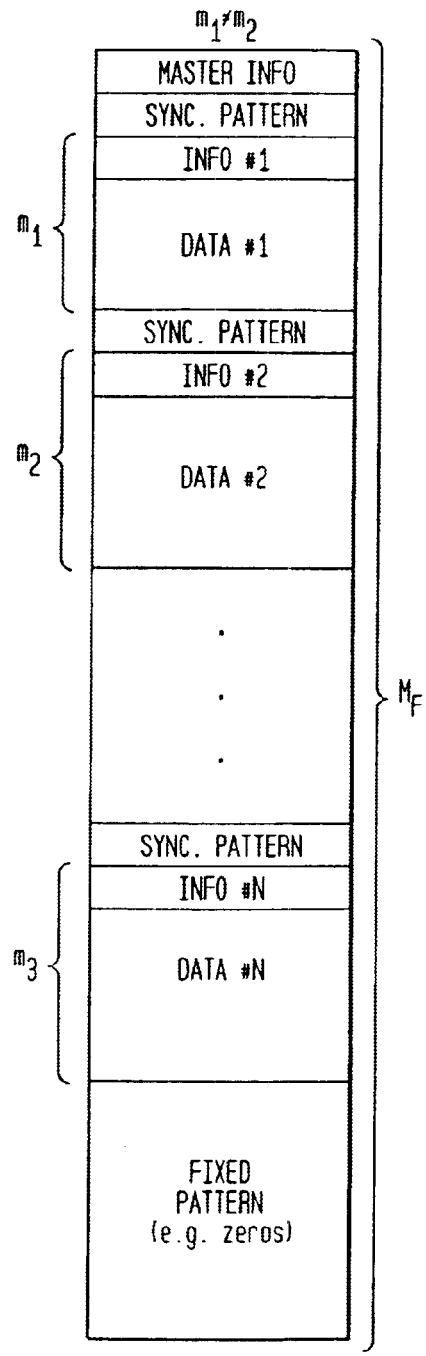

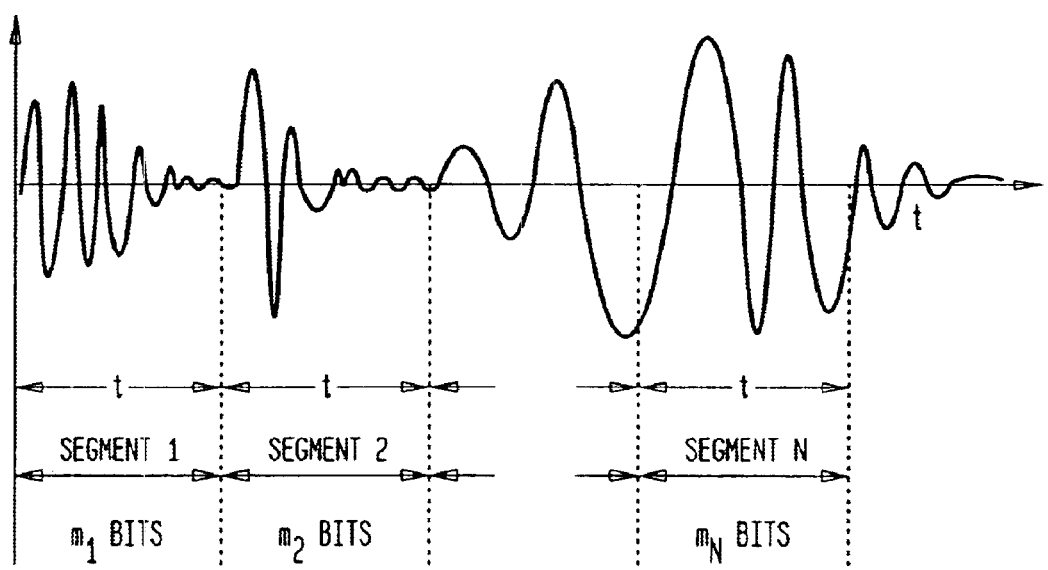

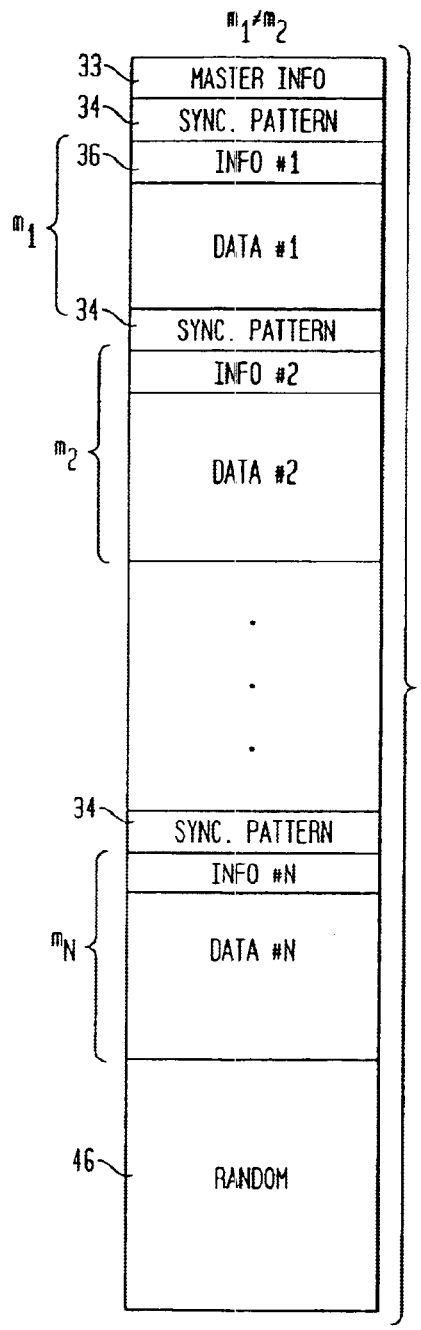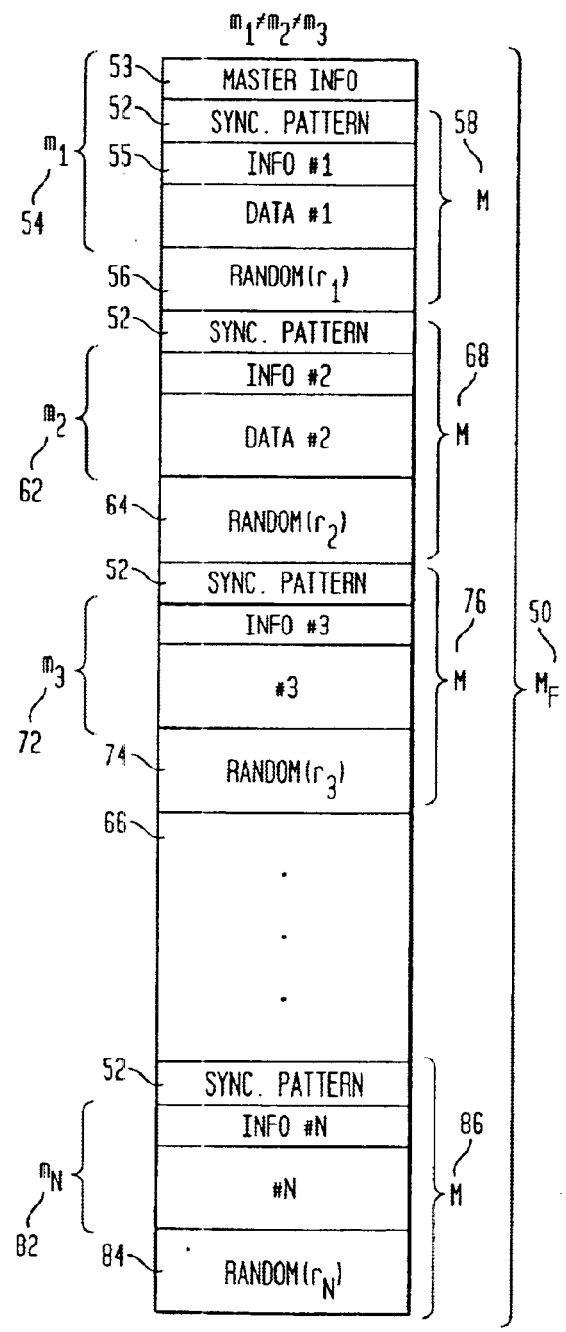

FRAME FORMATTING TECHNIQUE

FIELD OF THE INVENTION

The present invention relates to digital broadcasting. More particularly, it relates to a frame formatting technique for filling a fixed length master frame.

BACKGROUND OF THE INVENTION

Currently, digital broadcasting systems are becoming increasingly popular for delivering high quality audio and video content to individual consumers. In a typical digital broadcasting system, as depicted in FIG. 1, an analog signal on an input line 10 is sampled by a digital encoder 120. The samples are digitized and encoded to form data frames which contain digital representations of the analog signal. The data frames are then combined to form a master data frame defining a string of bits known as a bit stream on line 130. The master data frame is then modulated by a digital modulator 140 for broadcasting the master data frame over a broadcasting channel 150. The modulated signal is then received and demodulated by a digital demodulator 160 to derive a bit stream on line 170 which is equivalent to the original bit stream on line 130. A digital decoder 180 then decodes the bit stream 170 to obtain an analog signal at output line 190 which can be output to an analog device such as a speaker.

The digital encoder samples the analog signal, digitizes the samples, and encodes the samples. Generally, the digital encoder collects a number N of digitized samples and generates a frame of encoded data based on the set of N digitized samples. FIG. 2 depicts a typical digital encoder. An analog signal on input line 210 is sampled by the digital encoder 220 at its input for a specified period of time, x. The digital encoder 220 then produces an output signal on output line 230 which is a digital representation of the analog signal on input line 210. In a fixed rate encoder, the output for each set of N digitized samples of the analog signal on input line 210 will contain the same number of bits which are defined by individual data frames of equal length.

FIG. 3 depicts a master data frame $M_F$ which is completely filled with the individual data frames, $m_1$–$m_N$. Each master data frame $M_F$ contains a few bits of master frame information $M_{Fi}$, such as the length of the master frame and the number of individual data frames within the master frame $M_F$. The remainder of the master data frame $M_F$ is filled with the individual data frames, $m_1$–$m_N$. The individual data frames, $M_1$–$M_N$, also contain a few bits of individual data frame information, $m_{1i}$–$m_{Ni}$, such as the length of the frame. Because the individual data frames, $m_1$–$m_N$, are fixed in length, a system can be designed where master data frames $M_F$ are entirely filled with a specified number of individual data frames, $m_1$–$m_N$.

Presently, however, many digital encoders are variable rate digital encoders. For example, the digital encoders used to encode audio signals are generally variable rate encoders. In a variable rate encoder, the digital output for each set of N digitized samples of the analog signal may contain a different number of bits which are defined by data frames of unequal length. Variable rate audio encoders are used because they produce better digitized audio signals than fixed rate audio encoders in terms of lowering the number of bits required to accurately encode the audio signal without reducing the quality of the audio signal. The variable rate audio encoders are typically designed around the human perception of audio signals in order to minimize the number of bits required to accurately portray the audio signal digitally.

The audio encoders encode the audio samples into individual frames using a variable bit rate, resulting in individual frames which fluctuate in length based on the complexity of the audio segments being sampled. The sampling of an audio signal having segments, $S_1$–$S_N$, of varying complexity is depicted in FIG. 4. Each segment of the analog audio signal is for a specified period of time, t, and produces frames, $m_1$–$m_N$, which define a number of bits that may vary in number from segment to segment.

Most digital transmission systems transmit digital signals using fixed length master frames, with each fixed length master frames comprising master frame information and a number of smaller frames of encoded data where each frame is preceded by a synchronization pattern. Ideally, the total number of bits defined by all of the digitized samples and synchronization patterns and the master frame information would equal the number of bits defined by the fixed length master frame $M_F$. However, due to the variable bit rate of a variable rate encoder, the total number of bits defined by the encoded audio segments and master frame information may be less than the number of bits defined by the fixed length master frame $M_F$. When the total number of bits is less than the fixed length master frame $M_F$, some of the bits in the fixed length master frame $M_F$ are unused. As depicted in FIG. 5, the unused bits in a fixed length master frame $M_F$ are generally filled with a fixed pattern, such as all zeros, to indicate that no data is being transmitted. The unused portion may also be used to send other information such as text messages or other data of a non-random nature. However, filling the unused portion with a non-random pattern such as zeros or text, decreases the randomness of the fixed length master frame $M_F$ which results in system inefficiency. As is known in the art, system efficiency is maximized in a system which transmits modulated signals by maximizing the randomness of the signal to be transmitted. Non-random data patterns result in a modulated signal with higher peak power. This causes an increase in the systems peak-to-average power ratio (PAR). The higher PAR necessitates more amplifier power to transmit the modulated signal with the increased peaks operating in a linear region of the amplifier. Increasing the randomness of the data pattern results in a modulated signal with a lower PAR, thus reducing the need for more amplifier power. Hence, system efficiency increases as randomness increases.

SUMMARY OF THE INVENTION

The present invention discloses a superior frame formatting technique for optimally filling a fixed length master data frame with a number of variable length frames and additional data to increase the randomness of the fixed length master frame. The frame formatting technique involves introducing random data to the fixed length master frame. Increasing the randomness of the fixed length master frame results in greater broadcast efficiency in a digital broadcasting system.

BRIEF DESCRIPTION OF THE DRAWINGS

FIG. 3 is a pictorial representation of a prior art master frame filled with fixed length data packets.

FIG. 4 is a graph of a analog signal of varying complexity.

FIG. 5 is a pictorial representation of a prior art master frame filled with variable length data packets.

FIG. 7 is a pictorial representation of an embodiment of a master frame filled with variable length data packets in accordance with the present invention.

FIG. 8 is a pictorial representation of a preferred embodiment of a master frame filled with variable length data packets in accordance with the present invention.

DETAILED DESCRIPTION OF THE INVENTION

The present invention discloses a technique for maximizing randomness in a fixed length master frame comprising variable length encoded data frames. In accordance with the invention, the fixed length master frame is filled with master frame information, variable length encoded data frames, synchronization patterns, and additional random data to randomize the data defined by the fixed length master frame. The additional random data is added to unused portions of the fixed length master frame. The present invention increases the randomness of the fixed length master frame compared to using a non-random pattern for the unused portion of the fixed length master frame. By maximizing the randomness of the fixed length master frame, it is well known in the art that a more efficient modulated signal can be produced. Non-random data patterns may result in a modulated signal having a higher peak to average power ratio (PAR). The higher PAR necessitates more amplifier power to transmit the modulated signal. Increasing the randomness of the data pattern results in a modulated signal with a lower PAR, thus reducing the need for more amplifier power. The random data may be another data channel or filler. If another data channel is used, it may be randomized by a scrambler at the transmitter and de-randomized by a de-scrambler at the receiver. If it is filler, pseudo-random data generated by a processor may be added at the transmitter and then removed or disregarded at the receiver.

Figure 1:
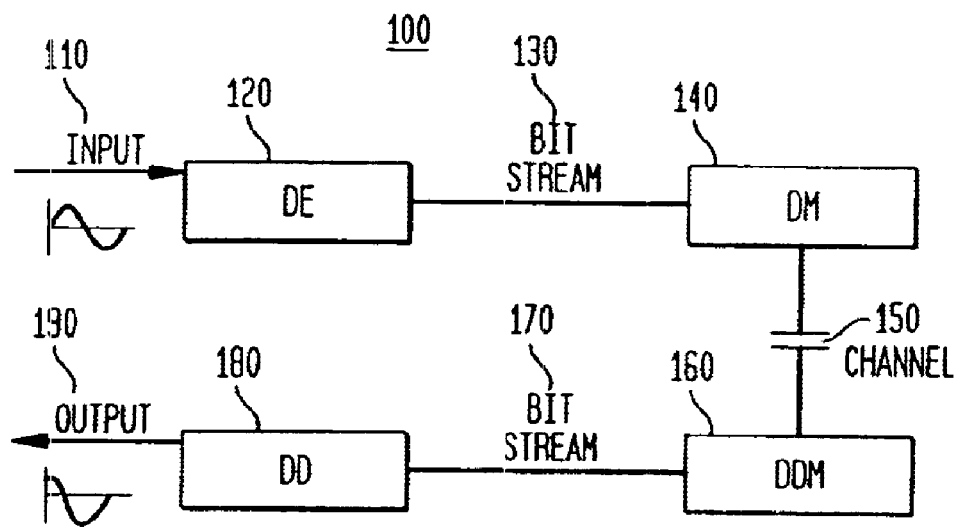
FIG. 1 is a block diagram of a prior art digital broadcasting system.
Figure 2:
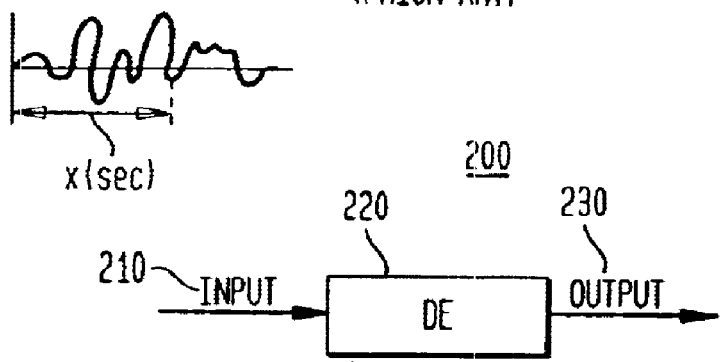
FIG. 2 is a block diagram of the prior art digital encoder of FIG. 1.
Figure 6:
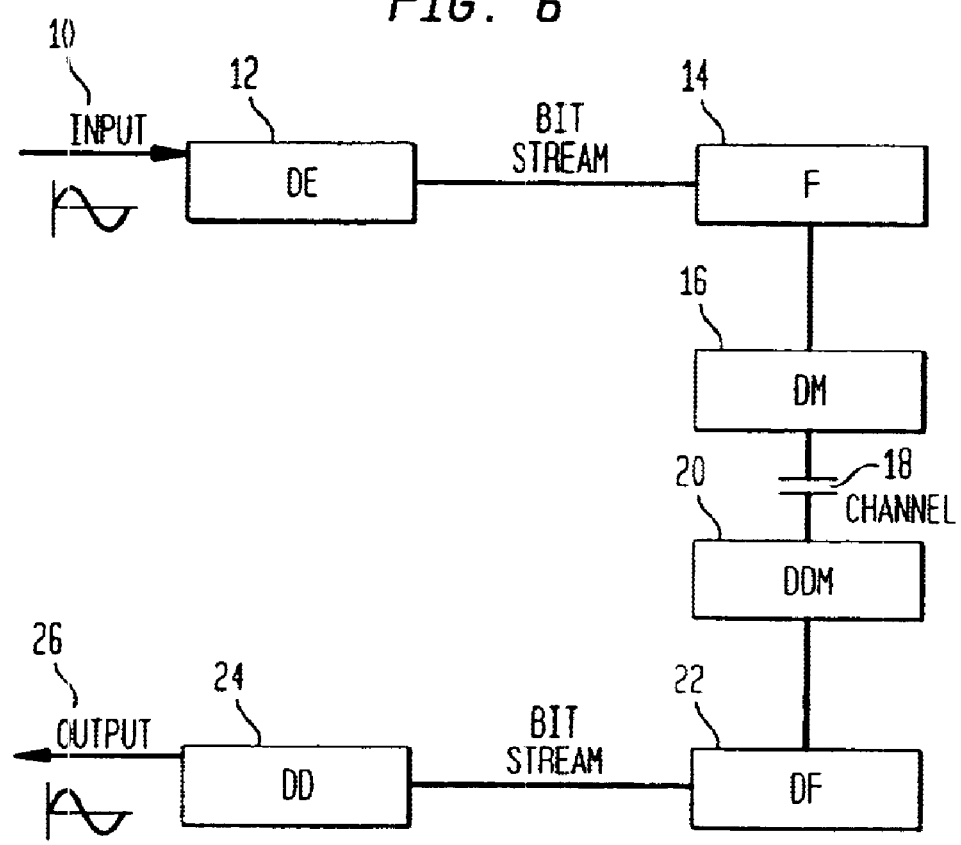
FIG. 6 is a block diagram of a digital broadcasting system in accordance with the present invention.

FIG. 6 depicts a digital broadcast system in accordance with the present invention.

In FIG. 6, an analog signal on input line 10 is used as an input for digital encoder 12. Digital encoder 12 samples the analog signal and produces a bit stream which comprises variable length data frames which are digitally encoded representations of the individual segments of the analog signal. The variable length data frames are then formatted by formatter 14. Formatter 14 combines the variable length data frames with synchronization patterns and adds random data to the unused portion of the frame to produce a fixed length master frame. By adding random data to the unused portion of the frame, the randomness of the fixed length master frame is increased. It is well known in the art that maximizing the randomness of the fixed length master frame produces a better behaved modulated signal for transmission in terms of the systems peak-to-average ratio (PAR). The PAR translates to a requirement on the power amplifier. This requirement dictates how much power the amplifier must provide linearly, above the average power of the amplifier, to avoid non-linearities caused by the peaks due to the non-randomness of the transmitted data. The fixed length master frame is modulated by digital modulator 16 and transmitted over a digital broadcast channel 18.

The modulated signal is then received and demodulated by digital demodulator 20. The demodulated signal is then de-formatted by de-formatter 22 which removes the synchronization patterns and the random data to derive the original bit stream which comprises variable length data frames which are digitally encoded representations of the individual segments of the analog signal. The bit stream is then decoded by digital decoder 24 to produce an analog output signal on output line 26. The analog output signal can be output to an analog device for perception by an end user.

FIG. 7 represents an embodiment of a fixed length master frame 32 in accordance with the present invention. The master frame 32 formatting may take place in a formatter, a digital encoder, or a combination of the two. The master frame 32 is formatted by inserting master frame information 33, variable length data frames $m_1-m_N$, synchronization patterns 34, and random data 46. Each variable length data frame $m_1-m_N$, such as variable length data frame 36, is preceded by a synchronization pattern 34. After the master frame information 33, variable length data frames $m_1-m_N$, and synchronization patterns 34 are inserted into the ter frame 32, any unused portion is filled with random data 46. It is important to note that the random data portion may be added via a lookup table, thereby requiring very little computational complexity. The lookup table would be large enough to introduce randomness to the application at hand, eg. 32 K bits, and would be used over and over again, as needed, within a master frame period. The addition of random data 46 increases the randomness of the master frame 32, producing an efficient fixed length master frame 32 suitable for modulated transmission. In this embodiment, the randomness is increased in the master frame 32 by adding random data to the end of the master frame 32. While adding random data 46 to the end of the master frame 32 increases the randomness of the master frame 32, the randomness of the master frame 32 could be increased even further if the random data 46 was interspersed throughout the entire length of the master frame 32.

FIG. 8 represents a preferred embodiment of a fixed length master frame 50 in accordance with the present invention. In the embodiment depicted in FIG. 8, a frame formatting technique in which the randomness of the master frame 50 is maximized by interspersing random data $r_1-r_N$ throughout the entire length of master frame 50 is disclosed. This technique offers even more randomness than the technique described in FIG. 7, which introduces random data only at the end of the master frame 32. The fixed length master frame 50 formatting may take place in a formatter, a digital encoder, or a combination of the two. The master frame 50 is formatted by inserting master frame information 53 and a number of fixed length frames M, such as fixed length frame 58. The fixed length frames M all define the same number of bits. Additional fixed length frames 66 fill fixed length master frame 50. The total number of bits defined by the master frame information 53 and all of the fixed length master frames M equals the number of bits defined by fixed length master frame 50. Fixed length frame 58 comprises a synchronization pattern 52, variable length frame information 55, variable length data frame 54, and a sufficient amount of random data 56 to completely fill fixed length frame 58. The addition of random data 56 maximizes the randomness of the fixed length data frame 58.

Each fixed length frame M comprises a synchronization pattern 52; a variable length data frame 54, 62, 72, and 82; and random data 56, 64, 74, and 84. The amount of random data required to fill a fixed length frame M varies inversely to the length of the variable length frame, $m_1-m_N$. As the length of a variable length data frame, $m_1-m_N$, increases, the number of random bits required to fill a fixed length frame M decreases. For example, if variable length frame 62 defines more bits of data than variable length frame 54, less random data 64 will be required to produce fixed data frame 68 than would be required to produce fixed data frame 58. The addition of random data, $r_1-r_N$, to each of the fixed length frames M maximizes the randomness of the fixed length master frame 50, producing an efficient fixed length master frame 50 suitable for modulated transmission.

A further advantage of the preferred embodiment over the embodiment depicted in FIG. 7 arises from the synchronization patterns being more evenly dispersed throughout the master frame 50. This results in efficiencies in the de-formatter 22 of FIG. 6 since, as is well known in the art, a de-formatter 22 functions more efficiently when the sync patterns between data frames are arranged in a more regular fashion. This is especially advantageous during periods of non-complex signals, such as periods of silence, where, in the embodiment depicted in FIG. 7, the synchronization patterns would be concentrated toward the beginning of master frame 32 since the non-complex signal would result in short variable length data frames $m_1-m_N$.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A frame formatting method for introducing randomness to a fixed length master frame having a first number of bits comprising the steps of:
  padding each of a plurality of variable length frames with a synchronization pattern and a quantity of random data, said quantity calculated to produce a plurality of fixed length frames, said plurality of fixed length frames comprising a second number of bits; and
  filling said fixed length master frame with said plurality of fixed length frames, such that said first number of bits in said fixed length master frame equals the total second number of bits in said plurality of fixed length frames;
  whereby randomness is increased in said fixed length master frame.

2. A digital audio broadcasting frame formatting method for formatting a fixed length master frame defining a first number of bits comprising the steps of:
  sampling, digitizing, and encoding an audio signal to derive a plurality of variable length frames;
  padding each of said plurality of variable length frames with a synchronization pattern and a quantity of random data, said quantity calculated to produce a plurality of fixed length frames, said plurality of fixed length frames comprising a second number of bits; and
  filling said fixed length master frame with said plurality of fixed length frames, such that said first number of bits in said fixed length master frame equals said second number of bits in said plurality of fixed length frames;
  whereby randomness is introduced to said fixed length master frame.

3. A digital broadcasting method comprising:
  encoding a first analog signal, said step of encoding comprising sampling, digitizing, and encoding segments of said first analog signal and generating a plurality of variable length data frames corresponding to said segments;
  padding each of said plurality of variable length frames with one of a plurality of synchronization patterns and a portion of a plurality of random data to produce a plurality of fixed length frames of equal length; and
  entirely filling said fixed length master frame with said plurality of fixed length frames, such that the total length of said plurality of fixed length frames used to fill said fixed length master frame equals the length of said fixed length master frame, whereby randomness is increased in said fixed length master frame;
  modulating said fixed length master frame;
  transmitting said modulated fixed length master frame over a channel;
  receiving said modulated fixed length master frame from said channel;
  demodulating said modulated fixed length master frame to derive said fixed length master frame;
  de-formatting said fixed length master frame to remove said plurality of synchronization patterns and said plurality of random data bits to derive said plurality of variable length data frames corresponding to said segments; and
  decoding said plurality of variable length data frames corresponding to said segments to produce a second analog signal.

4. A digital broadcasting system comprising a variable rate encoder coupled to a first analog signal, said variable rate encoder sampling, digitizing, and encoding segments of said analog signal and generating a plurality of variable length data frames corresponding to said segments;
  a formatter coupled to said variable rate encoder for creating a formatted fixed length master frame having a first number of bits from said plurality of variable length data frames by inserting a plurality of synchronization patterns and a plurality of random data bits, wherein said formatter formats said fixed length master frame by padding each of said plurality of variable length data frames with one of said plurality of synchronization patterns and at least one of said plurality of random data bits to produce a plurality of fixed length frames, said plurality of fixed length frames comprising a second number of bits, and fills said fixed length master frame with said plurality of fixed length frames, such that said first number of bits in said fixed length master frame equals said second number of bits in said plurality of fixed length frames;
  a digital modulator coupled to said formatter for modulating said fixed length master frame to produce a modulated fixed length master frame;
  a channel coupled to said digital modulator for carrying said modulated fixed length master frame;
  a digital de-modulator coupled to said channel for de-modulating said modulated fixed length master frame to derive said fixed length master frame;
  a de-formatter coupled to said digital de-modulator for removing said plurality of synchronization patterns and said plurality of random data bits to derive said plurality of variable length data frames corresponding to said segments; and
  a variable rate decoder coupled to said de-formatter, said variable rate decoder decoding said plurality of variable length data frames corresponding to said segments and producing a second analog signal;
  wherein broadcasting efficiency is increased in said digital broadcasting system by increasing randomness in said fixed length master frames.

5. The digital broadcasting system of claim 4, wherein said digital broadcasting system is a digital audio broadcasting system.

6. A digital broadcasting transmitter comprising:
- a variable rate encoder coupled to a first analog signal, said variable rate encoder sampling, digitizing, and encoding segments of said first analog signal and generating a plurality of variable length data frames corresponding to said segments;
- a formatter coupled to said variable rate encoder for creating a formatted fixed length master frame having a first number of bits from said plurality of variable length data frames by inserting a plurality of synchronization patterns and a plurality of random data bits, wherein said formatter formats said fixed length master frame by padding each of said plurality of variable length data frames with one of said plurality of synchronization patterns and at least one of said plurality of random data bits to produce a plurality of fixed length frames, said fixed length frames comprising a second number of bits, and filling said fixed length master frame with said plurality of fixed length frames, such that said first number of bits in said fixed length master frame equals said second number of bits in said plurality of fixed length frames;
- a digital modulator coupled to said formatter for modulating said fixed length master frame to produce a modulated fixed length master frame;
- wherein broadcasting efficiency is increased in said digital broadcasting transmitter by introducing randomness to said fixed length master frame.

7. The digital broadcasting transmitter of claim 6, wherein said digital broadcasting transmitter is a digital audio broadcasting transmitter.

\* \* \* \* \*